(No Model.)
W. H. CLARK.
IMPLEMENT FOR CUTTING WEEDS AND BEANS.
No. 251,765. Patented Jan. 3, 1882.
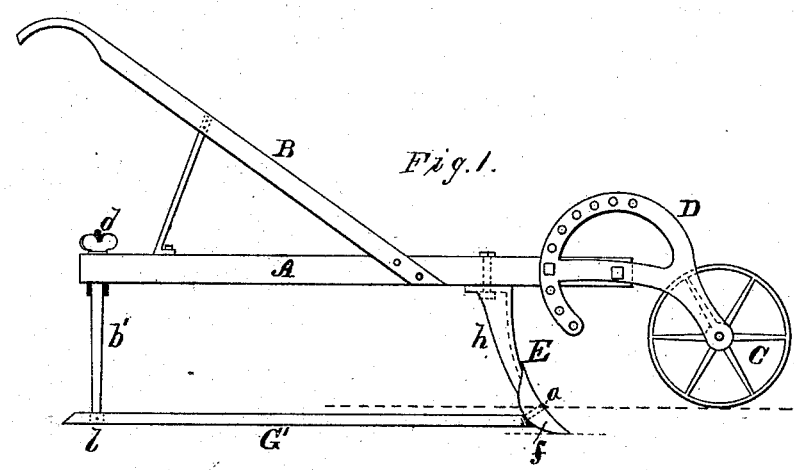
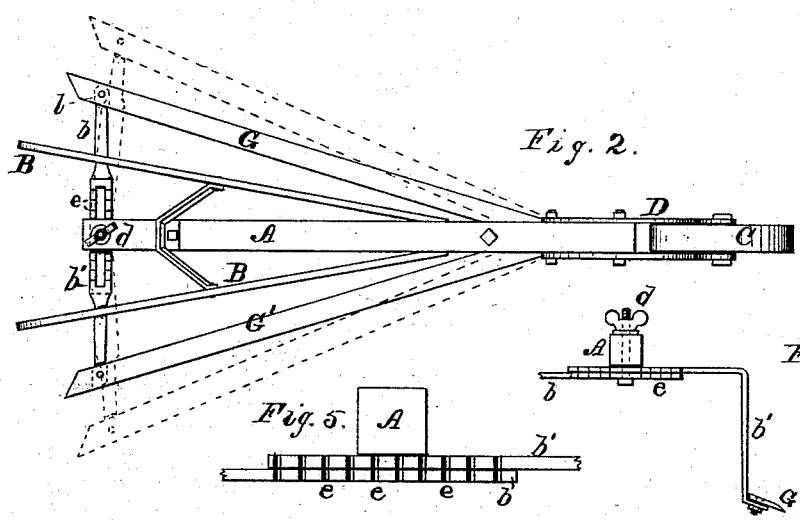
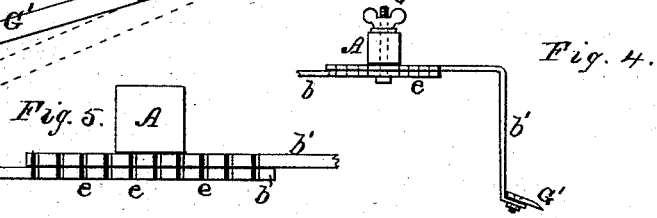
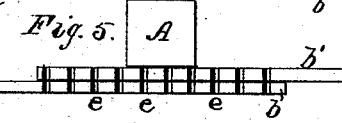
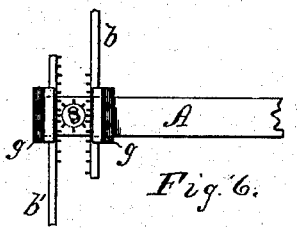
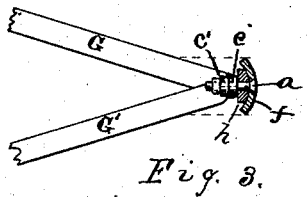
Attest:
M. D. Phillips
L. N. Beckwith
Inventor:
W. H. Clark
By C. B. Whitmore, Atty.

UNITED STATES PATENT OFFICE.

WILLIAM H. CLARK, OF GREECE, NEW YORK.

IMPLEMENT FOR CUTTING WEEDS AND BEANS.

SPECIFICATION forming part of Letters Patent No. 251,765, dated January 3, 1882.

Application filed August 22, 1881. (No model.)

*To all whom it may concern:*

Be it known that I, WILLIAM H. CLARK, of Greece, in the county of Monroe and State of New York, have invented a new and useful Improvement in Implements for Cutting Weeds and Beans, which improvement is fully set forth in the following specification and accompanying drawings.

The object of my invention is to produce an implement for farmers' use for cutting weeds, beans, or other vegetation by means of advantageously-arranged blades made to move horizontally just beneath the surface of the ground, the said implement being herewith fully described, and more particularly pointed out in the claims.

In the accompanying drawings, Figure 1 shows a side elevation of the said implement; Fig. 2, a plan of the same; Fig. 3, a detached view, showing the manner of connecting certain parts with parts in section; Fig. 4, a rear view of a portion of the implement; Fig. 5, an enlarged view, showing more clearly the graduated notch-marks of the blade-standards; and Fig. 6, a modification in the manner of expanding and contracting the blades.

In the figures, A represents a horizontal timber, constituting the frame or body of the implement, B the handles, C a wheel, D the wheel-standard, and E a furrow-tooth, all ordinary parts of farming utensils in common use.

G G' are two equal horizontal cutting-blades, each being a long thin strip of steel, held at their front ends by the bolt $a$, Figs. 1 and 3, that holds the shoe $f$ onto the standard $h$ of the furrow-tooth, and at their rear ends, respectively, by bent standards $b$ $b'$, secured to the timber A. The bolt $a$ passes through upturned loops $c$ $c'$ of the respective blades G G', and the ends of said blades at this point are brought close together and behind the shoe $f$, so that said ends encounter no earth as the implement is advanced along the ground.

The horizontal portions of the standards $b$ $b'$ are slotted, as shown in Fig. 2, and held against the under side of the timber A by a suitable fastening device, $d$. The slots in said parts $b$ $b'$ admit of the blades being expanded or contracted, as it may be wished to cut over a broader or narrower strip of ground, the joints at $l$ $l$ and $a$ being made yielding for the purpose of admitting of these adjustments.

As will be understood from the relative arrangement of parts shown in Fig. 1, the shoe or plow $f$ as the machine is advanced cuts a small furrow in the ground, along the surface of which ground the wheel C rolls, and the blades, three or four feet in length, pass along just beneath the surface of the ground without disturbing the same, and clip off the weeds, leaving them to wilt standing in their places.

For cutting beans, preparatory to pulling the blades are expanded sufficiently to cut two adjacent row simultaneously, after which said beans may be gathered with a common hay-fork.

The horizontal parts of the standards $b$ $b'$ are provided with marks or notches $e$, to assist the operator in adjusting the rear ends of the blades equidistantly from the timber A.

Fig. 6 shows the under side of a portion of the timber A and a modification in the manner of adjusting the rear ends of the blades. The horizontal portions of the standards $b$ $b'$ are made in the form of racks facing an intermediate pinion, $s$, said racks being held to place by retaining-pieces $g$ $g$. If the pinion be rotated by means of some suitable handle, the blades will be correspondingly moved in opposite directions.

This machine consists of but few simple parts, is comparatively inexpensive, and, on account of its lightness and the manner in which it moves along the ground, is of very light draft.

I am aware that the diverging adjustable blades and front tooth are not new, nor the adjusting device; but

What I claim is—

1. In combination with the body A and furrow-tooth E, the diverging blades G G', pivoted to the tooth E, and held to the body A by adjustable standards or parts $b$ $b'$.

2. The combination of the body A, tooth E, diverging blades G G', bent adjustable notched standards $b$ $b'$, and fastening device, as and for the purpose set forth.

W. H. CLARK.

Witnesses:
E. B. WHITMORE,
DELLE B. CRITTENDEN.